United States Patent [19]
DePetris

[11] Patent Number: 5,186,831
[45] Date of Patent: Feb. 16, 1993

[54] OIL SORBENT PRODUCTS AND METHOD OF MAKING SAME

[75] Inventor: Robert DePetris, Chatsworth, N.J.

[73] Assignee: Leucadia, Inc., La Jolla, Calif.

[21] Appl. No.: 824,810

[22] Filed: Jan. 21, 1992

[51] Int. Cl.$^5$ .............................................. B01D 1/28
[52] U.S. Cl. ............................... 210/242.4; 210/502.1; 210/924
[58] Field of Search ............... 210/924, 660, 671, 679, 210/680, 690–693, 242.4, 241, 242.1, 502.1, 506–509

[56] References Cited

U.S. PATENT DOCUMENTS

| | | |
|---|---|---|
| Re. 21,087 | 11/1982 | Sohl . |
| 3,764,527 | 10/1973 | Sohl . |
| 4,366,067 | 12/1982 | Golding et al. ..................... 210/924 |
| 4,380,570 | 4/1983 | Schwarz . |
| 4,737,394 | 4/1988 | Zafiroglu ........................ 210/924 |
| 4,792,399 | 12/1988 | Haney et al. ...................... 210/924 |
| 4,851,273 | 7/1989 | Brown ............................. 210/924 |
| 4,879,170 | 11/1989 | Radwanski et al. . |

OTHER PUBLICATIONS

J. Grant, Ed., "Hackh's Chemical Dictionary," McGraw-Hill Book Co., Inc., 3rd. Edition, p. 591.

Primary Examiner—Frank Sever
Attorney, Agent, or Firm—Lucas & Just

[57] ABSTRACT

A product for sorbing oil is disclosed. The product comprises an absorbent fiber core encapsulated in an adsorbent sheet, the adsorbent sheet being oleophilic, substantially hydrophobic, and capable of passing oil therethrough to the absorbent core. An apparatus and a method for forming the sorbent product are also disclosed.

21 Claims, 3 Drawing Sheets

FIG. 5 (PRIOR ART)
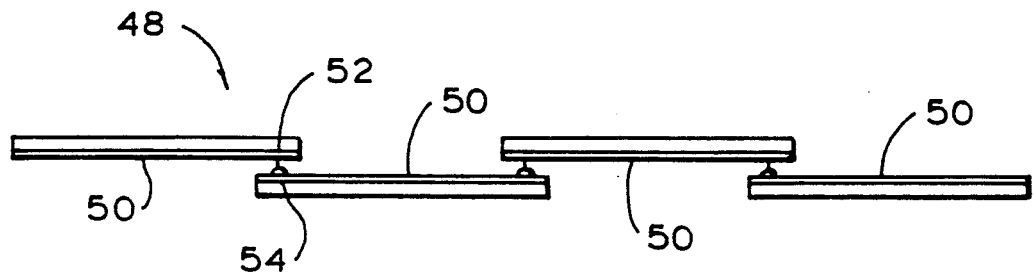
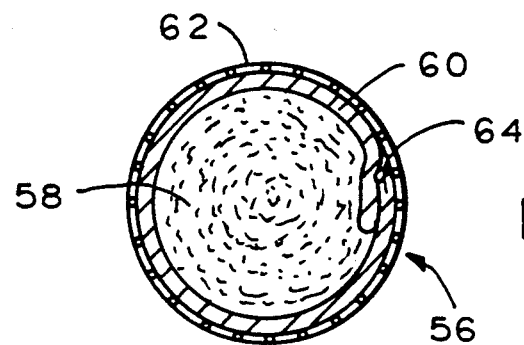
FIG. 6
FIG. 7
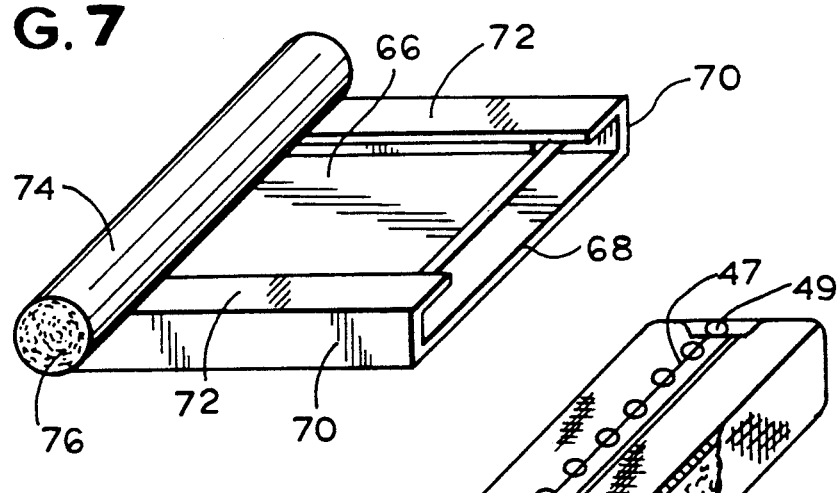
FIG. 8
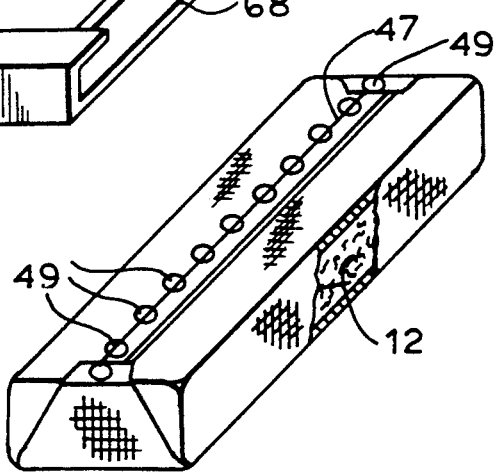

OIL SORBENT PRODUCTS AND METHOD OF MAKING SAME

The present invention relates to products for the sorption of oil and is of special interest for separation of oil from the surface of water and the containment or collection of oil in industrial and commercial applications. The present invention also relates to a unique apparatus and method for manufacturing sorbent products.

In today's world, oil pollution is one of the greatest environmental concerns of mankind. There are few, if any, who have not heard of the gigantic oil spill caused by the Exxon Valdez running aground in Alaska. Although this was a gargantuan and well-known oil spill, there are lesser oil spills and contaminations which pollute waterways, land areas, and industrial and commercial facilities on a daily basis. For example, the bilge pumped from a boat usually contains at least some amount of oil. Industrial operations, such as the cutting of metal, frequently use cutting oils. Oil dripped from automobiles routinely washes down into lakes and rivers with rain run-off and causes pollution. Efforts are constantly underway to reduce or eliminate as many of these sources of oil contamination as possible. One of the ways that this is done is with sorbent products.

Oil sorbent products are very well known in the art. They come in many different sizes and shapes and have varying applications. There are generally two types of sorbent products, i.e. those that absorb and those that adsorb.

Referring first to the absorbent products, these are generally composed of natural fibers, notably cellulose fibers such as wood fibers, cotton fibers, fabric waste, etc. The prime advantages of these natural fiber products are low cost, good oil absorption and capacity, and biodegradability. The chief drawback to these materials is that, even when treated to repel water, they eventually break down and absorb water. As a result, their use in separating oil from water is quite limited. While they can be cast upon a fairly large oil spill and pick up the surface of the oil, if they are used in oil containment booms or in similar devices, they have a tendency to take on water which can make them sink below the level of the oil and, in any case, after prolonged use the fibers break down and the water takes up much of their absorptive capacity so that there is little remaining room for absorption of oil.

The other type of products commonly used for oil pick-up, and especially for sorption of oil from water such as in containment booms, is the adsorbent materials. Typical of these adsorbent materials are the polymers described in U.S. Pat. No. 3,764,527, the relevant teachings of which are incorporated herein by reference. The adsorbent polymers have a great affinity for oil but have little or no affinity for water, i.e. they are hydrophobic. Indeed, their affinity for water is so poor that they sometimes "ride too high" when used as containment booms, i.e. they rest so high on the surface of the water that oil can pass under them in even mildly choppy waters.

Oil adsorbers are generally used in two different forms. One form is as an extruded non-woven fiber blanket. The blanket can be cut to various sizes and used "as is". The other form is as loose fibers. The loose fibers can be stuffed into a mesh bag having the shape of a pillow case or they can be stuffed into long mesh tubes, referred to in the industry as "socks", to form barrier booms. In either case, the mesh casing is of quite fine mesh size so that the fibers do not escape and become a pollutant themselves.

While adsorbent products are very good at separating oil from water, their prime disadvantage is high cost. This cost involves the raw material cost, the processing cost, and the "packaging" cost. For example, if the adsorbent polymer is extruded as a blanket, this adds substantial processing cost, in addition to the relatively high cost of the polymer material itself. Where adsorbent polymer fibers are used, the cost of the fine mesh bags or socks (mesh size typically $5/32 \times 5/32$ inch) adds significantly to the cost.

In accordance with the present invention, there is disclosed a combination of absorbent and adsorbent materials which is excellent for the sorption of oil, especially the sorption of oil from bodies of water. The product of the present invention has the further advantage of acting like an adsorbent polymeric material, but at substantially lower cost. The product of the present invention comprises a core of absorbent material with an encapsulating blanket or sheet of adsorbent material. Oil will wick through the adsorbent material and be absorbed by the absorbent material; at the same time, however, because the polymeric encapsulant is hydrophobic, little water will penetrate through the encapsulating blanket. Furthermore, because the encapsulant is in sheet form, any need for a bag or tube to contain the material can be of relatively large mesh, e.g. $\frac{1}{8} \times 178$ inch to $1 \times 1$ inch. It will be appreciated that while square mesh net is preferred, rectangular or other shaped nets can also be employed.

These and other aspects of the present invention may be more fully understood with reference to the drawings wherein:

FIG. 5 is a typical arrangement of booms in accordance with the prior art;

FIG. 6 is a cross-section of a boom made according to the present invention;

FIG. 7 is an alternative means for forming the core of the boom shown in cross-section in FIG. 6; and FIG. 8 is another product made according to the present invention.

Figure 1:
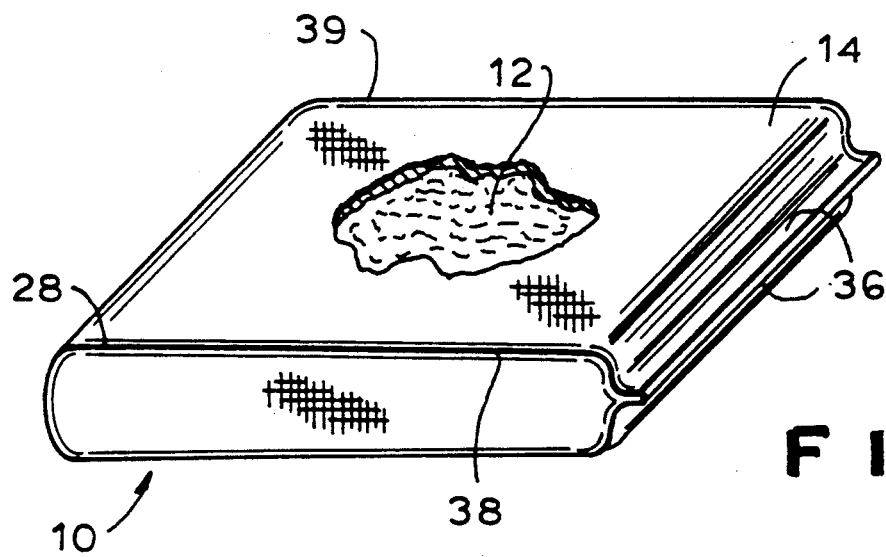
FIG. 1 is a cutaway view of a pillow made in accordance with the present invention.
Figure 3:
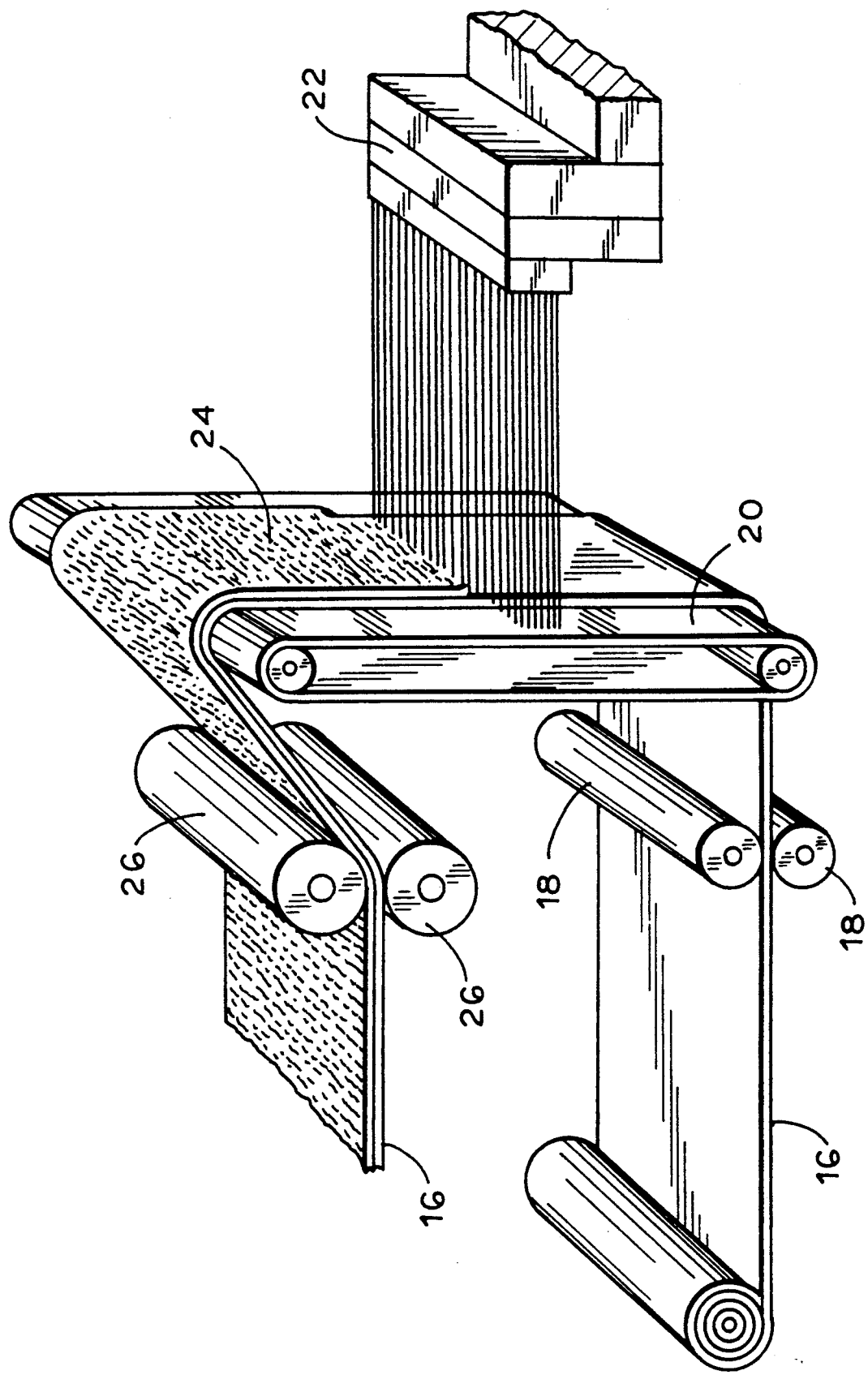
FIG. 3 is a perspective view of a process for the formation of products according to the present invention.

Referring first to FIG. 1, there is shown an oil sorbent pillow made in accordance with the present invention. The pillow 10 comprises oil absorbent fibers 12, preferably in blanket form, within an encapsulating adsorbent blanket 14. The product is suitably prepared by the process shown in FIG. 3. In FIG. 3, a fiber blanket 16 is fed between a pair of nip rolls 18 to a vacuum screen 20. As the blanket 16 travels up the vacuum screen, a melt blown adsorbent fiber material, such as polypropylene, is applied thereto from melt blow die 22. The composite 24 of the fiber blanket and the melt blown adsorbent material travels over the top of the vacuum screen 20 to a second pair of nip rolls 26 and then is collected on a collection roller (not shown).

Figure 4:
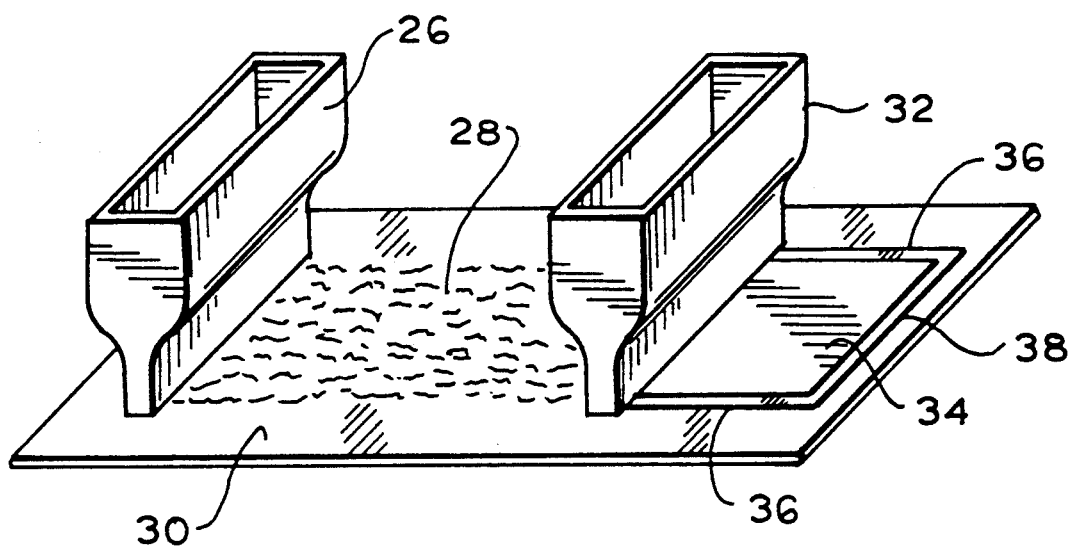
FIG. 4 is a perspective view of an alternate process for the formation of products according to the present invention.

The composite product may, of course, be formed in other manner. For example, the product may be made by a process employing the apparatus shown in FIG. 4. As shown in FIG. 4, hopper 26 deposits absorbent fibers 28 onto a moving vacuum belt 30. Extrusion head 32 lays down a sheet of adsorbent polymer 34 on top of the fibers 28 (it is to be noted that fibers 28 cannot be seen beneath polymer sheet 34). The polymer sheet 34 is wider on each side than the width of the blanket of fibers 28, thus forming fiber-free edges 36. Referring again to FIG. 1, the edges 36 are brought together and joined, e.g. by adhesive, heat-sealing or the like. The blanket of fibers 28 can be formed discontinuously or can be cut before reaching extrusion head 32 so that the leading edge 38 and trailing edge (not shown) of adsorbent sheet 34 are also substantially fiber-free. Referring again to FIG. 1, the edges 38 and 39 are joined along the sides of pillow 10, thus completely encapsulating the absorbent blanket of fibers 12 within the adsorbent sheet 34.

When pillow 10 is brought into contact with oil, e.g. oil which is on the surface of the water, the oil will be adsorbed by and wick through the adsorbent sheet 34 and, after wicking through, will be absorbed by absorbent fibers 12. However, since the polymeric sheet 34 is hydrophobic, little water will penetrate through sheet 34 to the fibers 12; thus, since water is not present to break down the fibers, all or substantially all of the absorptive properties of fibers 12 are available for the absorption of oil over long periods of time.

Figure 2:
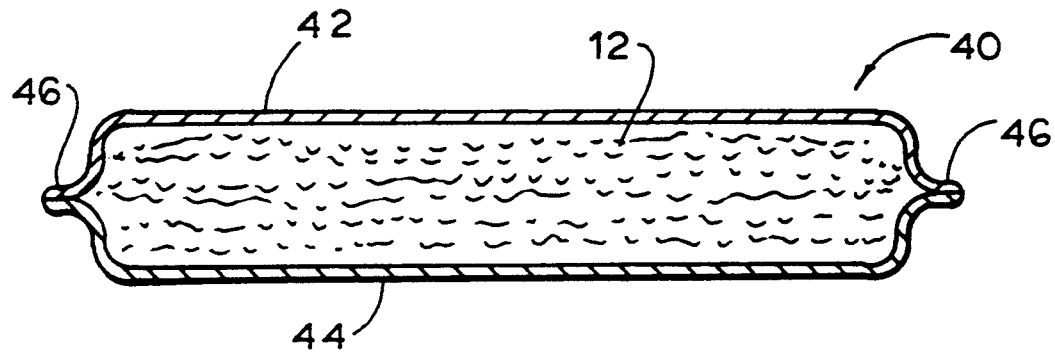
FIG. 2 shows a cross-section of an alternative embodiment of the pillow of FIG. 1.

FIG. 2 shows a cross-section of an alternative embodiment of a pillow made in accordance with the present invention. The pillow 40 comprises upper adsorbent sheet 42 and lower adsorbent sheet 44 which are joined along their end edges 46 and along their side edges (not shown). Absorbent fibers 12 are encapsulated between the upper sheet 42 and lower sheet 44. The sheets 42 and 44 are sealed along the entire periphery and the resulting structure is similar in appearance (but not in size) to ravioli.

Other methods of manufacture will be apparent to those of ordinary skill in the art. For example, the fiber blanket and the polymer sheet can be separately formed and then assembled together. This is of particular benefit in giving flexibility in sizing the blankets for fit, thus enabling a great range of products and product sizes. As another example, an open ended pillow can be formed from polymer sheet and then filled with absorbent fibers, preferably with the fibers being in the form of a blanket. After filling, the open end of the pillow can then be sealed. Another alternative is to fold a polymeric sheet about a fiber blanket and then seal the three open edges of the polymer sheet. Yet another method is to place a fiber blanket in a large piece of polymer sheet and then "wrap" the blanket in the sheet as one would wrap a present. The advantage to this method, the final product of which is illustrated as FIG. 8, is that there is only one "line" which must be sealed, that being line 47 as illustrated (shown with sonic sealed sputs 49).

Referring to FIG. 5, there is shown the way that oil barrier booms are typically constructed. A plurality of oil barrier booms 48 is shown. The booms comprise adsorbent fibers contained within a fine mesh tube (not shown). Each boom has a rope 50 extending from one end to the other. The booms are typically 10 feet in length and have a nominal diameter of 5 inches for a so-called small boom and a nominal diameter of 8 inches for a so-called large boom. Both the mesh tube and the rope are considered to be necessary to recover the heavy boom when it is oil-laden. The booms are interconnected by means of a clip 52 through rope 50 approximately 18 inches from the end of the boom which attaches to a ring 54 through rope 50 situated approximately 18 inches from the end of the adjacent boom.

FIG. 6 shows a cross-section of a boom made in accordance with the present invention and which can be used in the boom arrangement of FIG. 5. As shown in FIG. 6, the boom 56 comprises a central core of fibers 58, an encapsulating sheet of absorbent material 60 and a large mesh tube 62. The core 58 and the encapsulating sheet 60 can suitably be made by the apparatus of FIG. 3. One of the edges 24 can be sealed in overlapping fashion as shown. In this instance, the apparatus of FIG. 3 may be modified so that only a single fiber-free edge 64 is formed. Alternatively, two fiber-free edges can be formed and they can be joined in side-by-side fashion as illustrated in FIG. 1. As in the embodiment of FIG. 1, the leading edge and trailing edge (not shown in FIG. 5) of the encapsulating sheet are sealed together so that the fibers 58 are encapsulated within the adsorbent sheet 60. While FIG. 6 shows the cross-section of the boom to be round, it will be appreciated that it could be square, rectangular or of any other shape.

In operation, and as described with respect to the embodiment of FIG. 1, oil which contacts encapsulating sheet 60 will be adsorbed thereby and will wick therethrough into the interior core of fibers 58. The core of absorbent fibers 58 will absorb the oil which is wicked through adsorbent sheet 60. Since adsorbent sheet 60 is hydrophobic, little water will pass therethrough.

There can be advantage in having a small amount of water pass through adsorbent sheet 60. While any water passing through will eventually degrade some of the fibers and will occupy some of the absorptive capacity of fibers 58, any water absorbed by the fibers will also cause the blanket to ride lower in the water, thus creating a better barrier to the passage of oil. Small amounts of water can be permitted to pass through encapsulating sheet 60 either by controlling the thickness of the sheet, forming the sheet with pores, or adding pores to the sheet after it is formed. The sheet 60 can also be made somewhat hydrophilic, e.g. by the inclusion of hydrophilic fibers therein. It is to be noted that some water will, over time, pass through the polymer sheet if it is of melt blown fibers. This is due to the interstices in the melt blown blanket.

FIG. 7 illustrates an alternate, and preferred, method for forming an oil barrier boom. A blanket of absorbent fibers 66 is combined with a polymeric sheet 68 which has its edge flaps folded to form upright legs 70 and overlying legs 72. The assembly is rolled to form a roll 74, the ends of which are covered by edge flaps 76. Upon completion of rolling, there will be alternate layers of absorbent fiber sheet and adsorbent polymer sheet. The finished roll (not shown) is stuffed into a nylon mesh sock to form a final product similar to that of FIG. 6.

A nylon or other mesh sheet may be used for any of the products of the present invention, not only for oil containment booms. Where a mesh sheet is to be used, it can be intimately formed with the melt blown sheet. Referring, for example, to FIG. 3, fiber blanket 16 can be replaced by a mesh sheet. The melt blown polymer sheet will then form directly on the mesh sheet. This composite of mesh sheet and polymer sheet can then be used in any of the previously described applications for the polymer sheet alone.

The fibers which are useful in the present invention are any fibers which will absorb oil. These include both natural fibers and synthetic fibers; however, it is preferred that at least 50% of the fibers be natural fibers, and best results have been obtained when substantially 100% of the absorbent fibers are of natural origin. The natural fibers may typically be wood fibers, bleachboard, paper, textile waste fibers or any combination of the foregoing. Suitable wood fibers are those which are inexpensive, and at the present time include southern yellow pine and poplar. Suitable bleachboard and paper fibers include recycled paper packaging material and sulfite paper pulp. Suitable textile waste fibers include recycled thread waste. Synthetic fibers which are useful are those which absorb oil, e.g. open cell foam materials such as shredded polyurethane foam.

It will be appreciated that the core fibers, whether in blanket or loose form, may include adsorbent fibers as well as absorbent fibers. It is preferred, however, that at least about 25% of the core fibers be absorbent and it is more preferred that the core fibers be at least about 50% absorbent fibers. Very good results are obtained with at least 95% absorbent fibers and the most preferred embodiment has about 100% absorbent fibers.

The materials which are suitable for the encapsulating sheet of the present invention are those materials which are oleophilic, substantially hydrophobic, and which permit oil to pass through the adsorbent sheet to the absorbent inner core. Typical of the materials suitable for this purpose are the lower alkyl polymers, notably polyethylene and polypropylene, especially when extruded in intermingled fiber form as disclosed in U.S. Pat. No. 3,764,527.

The term "oil" as used herein is intended to be understood in its broadest sense. It therefore is broadly defined as a liquid that is not miscible with water and includes fixed oils, volatile oils, essential oils, mineral oils and petroleum-derived products. For a more complete definition, see *Hackh's Chemical Dictionary*, 3rd. Edition (1944), p. 591, the teaching of which is incorporated herein by reference. While the term oil is to be understood in its broadest sense, it will be understood that the present invention is particularly advantageous in the separation of petroleum-derived products from water and most particularly those hydrocarbons having a chain-length from about 6 carbons to about 26 carbons. Best results have been obtained with sorbing hydrocarbons having a chain length of 9 carbons to 20 carbons.

In the best mode contemplated by the inventor at the present time, an oil boom as shown in FIGS. 5 and 6 is made by the method shown in FIG. 3. The central core of fibers 58 consists of 100% natural cellulose fibers sold under the name TUFFLEX by Conwed Bonded Fiber of Riverside, N.J. The encapsulating sheet 60 is made of polypropylene and is made according to U.S. Pat. No. 4,380,570, the relevant teachings of which are incorporated herein by reference. The polypropylene sheet has a nominal thickness of about ¼ inch. The mesh casing 62 is of nylon construction and has a mesh size of 19/32×19/32 inch. In testing of this boom in a lagoon which is fed by a stream which frequently has oil on the surface thereof, it was found that the boom absorbed at least as much oil as a conventional boom of comparable dimensions made of adsorbent fibers. However, the boom according to the present invention was more than 25% cheaper to make than the boom with adsorbent fibers. It was noted that, over time, some water managed to penetrate into the absorbent core; rather than being a disadvantage, however, it was noted that this made the boom ride lower in the water, thus causing it to function more effectively as an oil barrier boom.

It will be understood that the claims are intended to cover all changes and modifications of the preferred embodiments of the invention herein chosen for the purpose of illustration which do not constitute a departure from the spirit and scope of the invention.

What is claimed is:

1. A composite fiber blanket and polymer sheet of a size sufficient to enable a great range of oil sorbent products and product sizes, said composite made from a process comprising the steps of:
   (a) providing a fiber blanket comprising oil absorbent fibers; and
   (b) encapsulating said fiber blanket in a polymer sheet of adsorbent material, said sheet of adsorbent material being oleophilic and substantially hydrophobic, said sheet being capable of passing oil therethrough and being substantially impervious to the passage of water therethrough.

2. The composite of claim 1 wherein at least about 25% of the blanket fibers are oil absorbent fibers.

3. The composite of claim 1 wherein at least about 50% of the blanket fibers are oil absorbent fibers.

4. The composite of claim 1 wherein at least about 95% of the blanket fibers are oil absorbent fibers.

5. The composite of claim 1 wherein about 100% of the blanket fibers are oil absorbent fibers.

6. The composite of claim 1 wherein the oil absorbent fibers comprise at least 50% natural fibers.

7. The composite of claim 6 wherein the natural fibers are selected from the group consisting of wood fibers, bleachboard fibers, paper fibers and textile waste fibers.

8. The composite of claim 1 wherein the oil absorbent fibers comprise substantially 100% natural fibers.

9. The composite of claim 1 wherein the natural fibers are selected from the group consisting of wood fibers, bleachboard fibers, paper fibers and textile waste fibers.

10. The composite of claim 1 wherein the sheet of adsorbent material comprises a lower alkyl polymer.

11. The composite of claim 10 wherein the lower alkyl polymer is selected from the group consisting of polyethylene and polypropylene.

12. The composite of claim 1 wherein the oil sorbent product is in the form of an oil sorbent pillow.

13. The composite of claim 12 wherein the oil pillow is enclosed with a mesh casing.

14. The composite of claim 1 wherein the oil sorbent product is in the form of an oil barrier boom.

15. The composite of claim 14 wherein the oil barrier boom is enclosed with a mesh casing.

16. The composite of claim 15 wherein the mesh casing is nylon and has a mesh size of from about ½×½ inch to about 1×1 inch.

17. The composite of claim 1 wherein a mesh casing is integral with said polymer sheet of adsorbent material.

18. The composite of claim 1 wherein said fiber blanket comprises at least 50% absorbent natural cellulose fibers, said fibers being capable of absorbing both oil and water, and said polymer sheet of adsorbent material being applied to said fiber blanket in the form of a melt blown sheet prior to encapsulating.

19. The composite of claim 18 wherein the said blanket fibers are substantially 100% natural cellulose fibers.

20. The composite of claim 1 wherein the width of said polymer sheet is greater than the width of the said blanket and the blanket is centered on the polymer sheet, and said blanket is encapsulated in said sheet by folding the polymer sheet over the edge of the blanket to which it is adjacent, and rolling the composite of the blanket and polymer sheet with folded over flaps upon itself lengthwise to form a tubular structure, the tubular structure being positioned within a mesh casing.

21. A method of separating oil from the surface of a body of water, said method comprising contacting said oil with an oil sorbent product, said oil sorbent product comprising a composite fiber blanket and polymer sheet made from a process comprising the steps of:
    (a) providing a fiber blanket comprising oil absorbent fibers; and
    (b) encapsulating said fiber blanket in a polymer sheet of adsorbent material, said sheet of adsorbent material being oleophilic and substantially hydrophobic, said sheet being capable of passing oil therethrough and being substantially impervious to the passage of water therethrough.

* * * * *

UNITED STATES PATENT AND TRADEMARK OFFICE
CERTIFICATE OF CORRECTION

PATENT NO. : 5,186,831
DATED : February 16, 1993
INVENTOR(S) : Robert DePetris

It is certified that error appears in the above-identified patent and that said Letters Patent is hereby corrected as shown below:

Col. 6, claim 9, line 41, change the dependency from "claim 1" to --claim 8--.

Signed and Sealed this

Sixteenth Day of November, 1993

Attest:

BRUCE LEHMAN

*Attesting Officer*    Commissioner of Patents and Trademarks